United States Patent
Kong et al.

(10) Patent No.: US 9,457,770 B2
(45) Date of Patent: Oct. 4, 2016

(54) SPRAY WASHER NOZZLE FOR VEHICLE

(71) Applicants: Hyundai Motor Company, Seoul (KR); NIFCO KOREA INC., Asan-si (KR)

(72) Inventors: Nak Kyoung Kong, Seongnam-si (KR); Bock Cheol Lee, Suwon-si (KR); Hyun Sub Kim, Seoul (KR); Dae Hwan Kim, Daejeon (KR); Young Sub Oh, Suwon-si (KR); Jin Hee Lee, Seoul (KR); Joon Ho Sung, Yangsan-si (KR)

(73) Assignees: Hyundai Motor Company, Seoul (KR); NIFCO KOREA INC., Asan-si (KR)

( * ) Notice: Subject to any disclaimer, the term of this patent is extended or adjusted under 35 U.S.C. 154(b) by 0 days.

(21) Appl. No.: 14/570,961

(22) Filed: Dec. 15, 2014

(65) Prior Publication Data

US 2015/0336544 A1    Nov. 26, 2015

(30) Foreign Application Priority Data

May 23, 2014    (KR) .................. 10-2014-0062318

(51) Int. Cl.
*B60S 1/46*    (2006.01)
*B60S 1/52*    (2006.01)
*B05B 1/10*    (2006.01)
*B05B 1/24*    (2006.01)

(52) U.S. Cl.
CPC ... *B60S 1/52* (2013.01); *B05B 1/24* (2013.01)

(58) Field of Classification Search
CPC .............. B60S 1/46; B60S 1/52; B05B 1/08; B05B 1/10; B05B 1/24
USPC .......... 239/130, 132–135, 284.1, 284.2, 552, 239/589.1
See application file for complete search history.

(56) References Cited

U.S. PATENT DOCUMENTS

| | | | | |
|---|---|---|---|---|
| 4,088,269 A | * | 5/1978 | Schlick | B05B 1/24 137/341 |
| 5,979,796 A | * | 11/1999 | Ponziani | B60S 1/52 219/202 |
| 6,220,524 B1 | * | 4/2001 | Tores | B05B 1/24 239/130 |
| 6,464,150 B1 | * | 10/2002 | Zimmer | B05B 1/323 239/115 |
| 6,626,377 B1 | * | 9/2003 | Vogt | B60S 1/52 239/104 |
| 2002/0000481 A1 | * | 1/2002 | Utz | B60S 1/522 239/284.1 |
| 2003/0234303 A1 | * | 12/2003 | Berning | B05B 1/08 239/589.1 |
| 2004/0256491 A1 | * | 12/2004 | Sporer | B60S 1/52 239/525 |
| 2007/0257133 A1 | * | 11/2007 | Bettenhausen | B60S 1/52 239/284.1 |
| 2009/0179084 A1 | * | 7/2009 | Hofmann | B60S 1/488 239/284.2 |

FOREIGN PATENT DOCUMENTS

| | | |
|---|---|---|
| EP | 0 353 643 A2 | 7/1989 |
| JP | 3147805 B2 | 1/2001 |
| JP | 2007-55594 A | 3/2007 |
| JP | 2013-177068 A | 9/2013 |
| KR | 2003-0031891 A | 4/2003 |
| KR | 10-0906639 B1 | 7/2009 |
| KR | 10-2014-0020091 A | 2/2014 |

* cited by examiner

*Primary Examiner* — Darren W Gorman
(74) *Attorney, Agent, or Firm* — Morgan, Lewis & Bockius LLP

(57) ABSTRACT

A spray washer nozzle for a vehicle may include a nozzle body installed in a hood of a vehicle as a unit for ejecting washer liquid to a windshield, and connected to a hose for supplying the washer liquid and fixedly installed in a hood panel at the same time, and a spray nozzle chip having a passage therein and inserted into a head part of the nozzle body, in which a heat emitter is inserted into and mounted to the passage formed in the interior of the spray nozzle chip such that washer liquid flowing through the passage of the spray nozzle chip is heated while directly contacting the heat emitter.

5 Claims, 4 Drawing Sheets

SPRAY WASHER NOZZLE FOR VEHICLE

CROSS-REFERENCE TO RELATED APPLICATION

The present application claims priority to Korean Patent Application No. 10-2014-0062318 filed May 23, 2014, the entire contents of which is incorporated herein for all purposes by this reference.

BACKGROUND OF THE INVENTION

1. Field of the Invention

The present invention relates to a spray washer nozzle for a vehicle, and more particularly to a spray type washer nozzle for ejecting washer liquid to a windshield of a vehicle to remove foreign substances stuck the windshield.

2. Description of Related Art

In general, a windshield for shielding blowing wind during driving of a vehicle or securing a front field of view is installed on the front side of an interior of the vehicle.

Because the surface of the windshield is frequently contaminated by foreign substances such as dust, the foreign substances such as dust stuck to the glass surface should be removed to sufficiently secure a front field of view and achieve safe driving of the vehicle.

A washer nozzle for ejecting washer liquid is provided together with a wiper system to remove foreign substances stuck to the windshield of the vehicle.

Accordingly, if the driver operates a washer switch installed in a driver seat to make the field of view clear, a washer motor associated with the washer switch is operated, the washer liquid stored in a washer liquid storage tank is ejected through a washer nozzle by the operation of the washer motor, and the vehicle can be safely driven while the driver secures the field of view after removing foreign substances which act as an obstacle to driving through the ejected washer liquid and the operation of the wiper.

The washer nozzle generally suitable for vehicles requires a performance of cleaning a wide area with a small amount of cleaning liquid for a short period of time, and accordingly, a cleaning area has been recently enhanced by using a spray type washer nozzle.

Meanwhile, the spray type washer nozzle in the related a problem of not being able to be used due to freezing of the nozzle part when the winter season washer function is used.

Accordingly, a spray nozzle heating technology for allowing smooth use of a washer by giving a defrosting function when the winter season (extremely cold place) washer liquid is frozen.

However, the existing spray nozzle heating technologies cause quality problems due to a defect in distribution of heat emitting elements because they generally employ indirect heating methods through heat emitting elements. Further, it is impossible to repair the heating emitting elements, power consumption is excessive due to indirect emission of heat (a maximum heat emission temperature of a PTC element is 120° C., and defrosting performance is lowered (a defrosting time of 3 to 5 minutes).

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a spray washer nozzle for a vehicle in which a space is formed in the interior of a spray nozzle chip and a heat emitter such as plastic PTC or ceramic PTC is inserted into and mounted to the space such that washer liquid can be heated while directly contacting the heat emitter, whereby defrosting performance can be achieved through direct heating of the spray nozzle.

Additionally, various aspects of the present invention are directed to providing a spray type washer nozzle which realizes a new type of spray washer nozzle in which washer liquid ejected from an outlet has a wide ejection angle using movements of center flows and stagnant flows, whereby ejection angle can be improved by replacing an existing spray washer nozzle having a narrow ejection area.

According to various aspects of the present invention, a spray washer nozzle for a vehicle may include a nozzle body installed in a hood of a vehicle as a unit for ejecting washer liquid to a windshield, and connected to a hose for supplying the washer liquid and fixedly installed in a hood panel at the same time, and a spray nozzle chip having a passage therein and inserted into a head part of the nozzle body, wherein a heat emitter is inserted into and mounted to the passage formed in the interior of the spray nozzle chip such that washer liquid flowing through the passage of the spray nozzle chip is heated while directly contacting the heat emitter.

The heat emitter may include a plate-shaped heat emitting element, a terminal mounted to a rear end of the heat emitting element, and a connector fixed to the nozzle body while being connected to the terminal.

The heat emitter further may include a sealing pad mounted to a connection portion of the heat emitting element and the terminal, for protecting the terminal from the washer liquid.

The heat emitting element may have a hole passing through a thickness of the heat emitting element and may be mounted to a vertically intermediate location of the passage located in the spray nozzle chip such that a section of the nozzle automatically has a dual spray nozzle structure while being separated into upper and lower parts.

The heat emitting element of the heat emitter may be formed of plastic PTC or ceramic PTC.

The spray nozzle chip may include an inlet at a rear end thereof through which washer liquid is introduced, an intermediate passage space, and an outlet at a tip end thereof through which the washer liquid is ejected, and two stagnant flow forming spaces are formed at opposite sides of an inner peripheral area of the passage space, and the two stagnant flow forming spaces may be partitioned by border walls on opposite sides protruding toward a center of a width of the passage.

The spray washer nozzle according to the present invention has the following advantages.

First, nozzle defrosting efficiency can be improved by configuring the heat emitter in a chip type, realizing a dual spray nozzle, and through direct heating of the spray washer nozzle.

Second, the heat emitter can be repaired by inserting the heat emitter into the spray nozzle chip.

Third, specifications of the spray washer nozzle can be diversified through changing the heat emitting nozzle chip (a heat emitting nozzle or a general nozzle).

Fourth, defrosting time can be reduced through direction heat emission and power consumption can be reduced by decreasing a target temperature of the heat emitter such as a PTC.

Fifth, because an injection angle of the washer liquid can be rapidly enhanced at an outlet of the nozzle by causing leftward and rightward movements of center flows with the movements of stagnant flows at two sites of the interior of the passage, a wide cleaning area can be secured, for example, by widely expanding the injection angle of the washer liquid.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
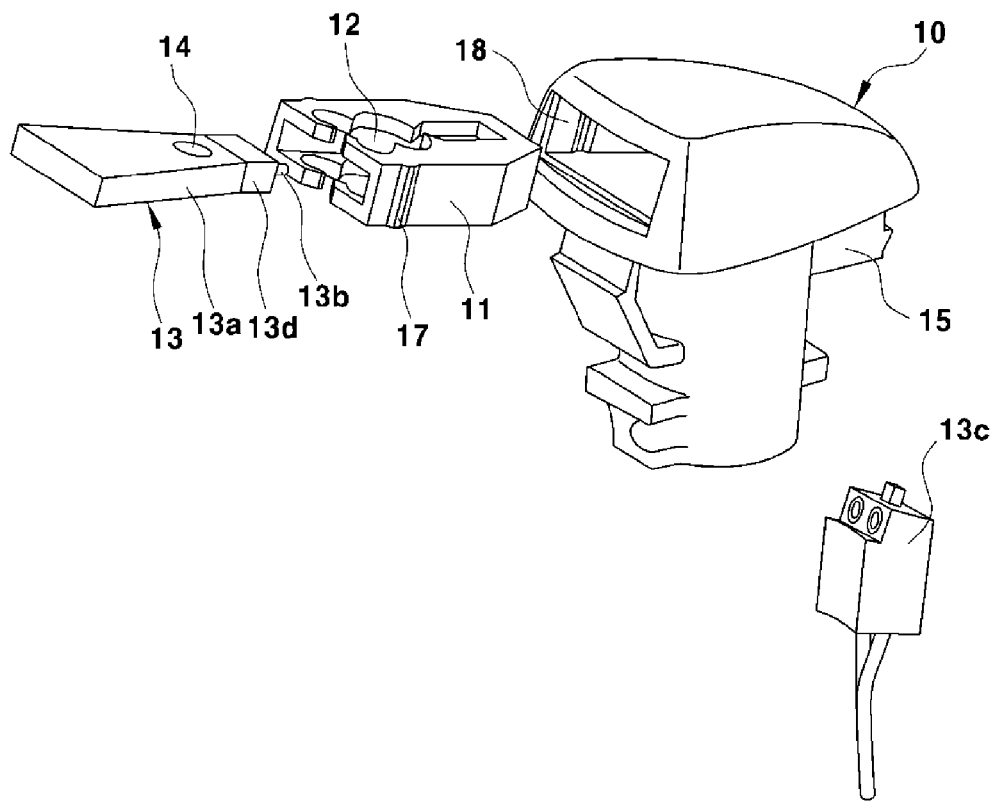
FIG. 1 is a perspective view showing an exemplary spray washer nozzle according to the present invention.
Figure 2:
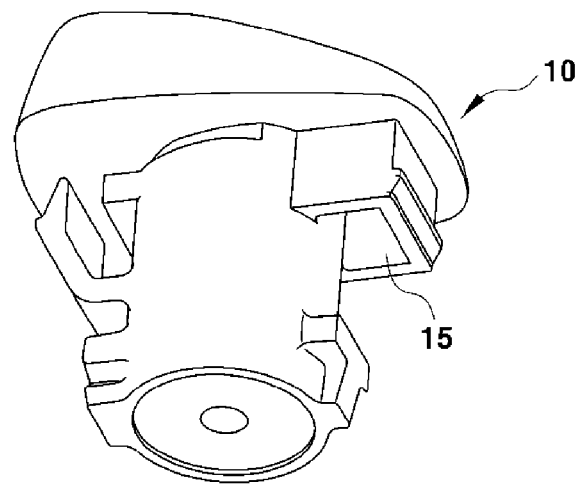
FIG. 2 is a perspective view showing a nozzle body of the exemplary spray washer nozzle according to the present invention.
Figure 3A:
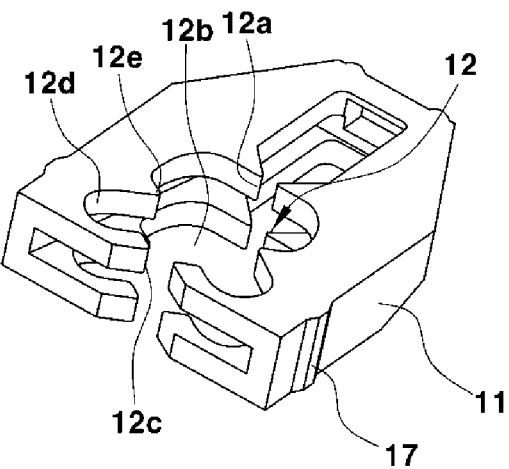
FIG. 3A and FIG. 3B are perspective views showing a spray nozzle chip of the exemplary spray washer nozzle according to the present invention.
Figure 3B:
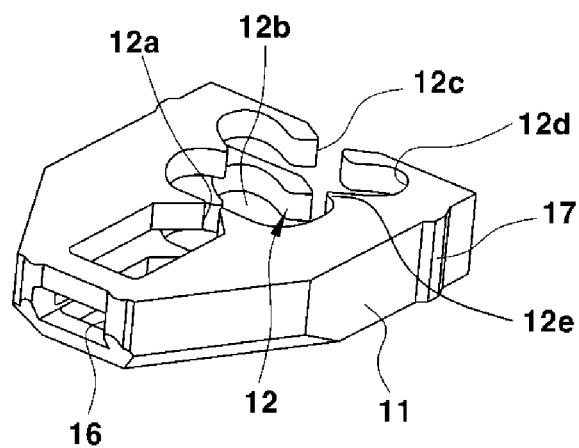
Figure 4A:
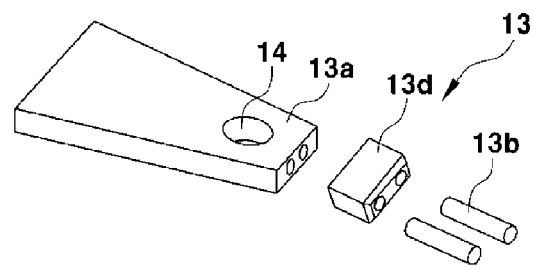
FIG. 4A and FIG. 4B are perspective views showing a heat emitter of the exemplary spray washer nozzle according to the present invention.
Figure 4B:
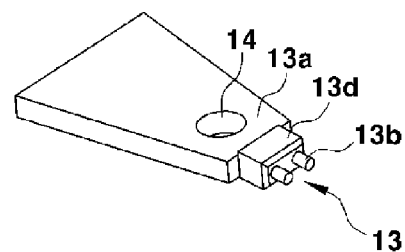

FIG. 1 is a perspective view showing a spray washer nozzle according to various embodiments of the present invention. FIG. 2, FIG. 3, FIG. 4A and FIG. 4B are perspective views showing a nozzle body, a spray nozzle chip, and a heat emitter of the spray washer nozzle according to various embodiments of the present invention.

As shown in FIG. 1, FIG. 2, FIG. 3A, FIG. 3B, FIG. 4A and FIG. 4B, the spray washer nozzle includes a nozzle body 10 installed in a hood of a vehicle as a unit for ejecting washer liquid to a windshield, and connected to a hose for supplying the washer liquid and fixedly installed in a hood panel at the same time, and a spray nozzle chip 11 inserted into a head part of the nozzle body 10 from the front side to the rear side while having a passage 12 therein.

The spray nozzle chip 11 is detachably mounted to a head part of the nozzle body 10, and may be fixed as catching bosses 17 on opposite surfaces of the spray nozzle chip 11 are caught by catching recesses 18 on an inner wall surface of the head part.

Accordingly, the washer liquid supplied through a lower end of the nozzle body 10 may be ejected to a windshield on the front surface through a tip end of the nozzle chip via the passage 12 in the spray nozzle chip 11 mounted to the head part.

In particular, a heat emitter 13 for directly heating the washer liquid while contacting the washer liquid is provided as a unit for defrosting the nozzle part when the nozzle part is frozen.

To this end, the heat emitter 13 is inserted into and mounted to the passage formed in the interior of the spray nozzle chip 11, and because the washer liquid is ejected after passing through the interior of the passage 12 to which the heat emitter 13 is mounted, the washer liquid directly heats the heat emitter 13, thereby improving defrosting performance through a direct heating method.

The heat emitter 13 is mounted to the interior space of the spray nozzle chip 11 in the form of a plate-shaped chip, that is, the heat emitter 13 is inserted into the passage 12 from the front side to the rear side.

Then, an opening portion which the heat emitter 13 may enter is formed at a tip end of the spray nozzle chip 11, and the heat emitter 13 may be inserted into the spray nozzle chip 11 through the opening portion.

In this way, because the spray nozzle chip 11 is detachably mounted and the heat emitter 13 is detachably mounted through the front opening portion of the spray nozzle chip 11, the heat emitter can be easily replaced during a repair thereof.

The heat emitter 13 is a portion which substantially emits heat, and includes a plate-shaped heat emitting element 13a, a terminal 13b mounted through a hole at a rear end of the heat emitting element 13a as a unit for supplying electric power, and a connector 13c connected to an external power source and connected to the terminal 13b.

Here, the connector 13c is fixedly mounted to a connector mounting hole 15 provided at a rear portion of the nozzle body 10, and in this mounting state, the connector 13c is connected to two terminals 13b on the rear side of the inside of the head portion of the nozzle body 10.

Then, the connector 13c is press-fitted from the lower side to the upper side through the connector mounting hole 15 at a lower end of a rear portion of the nozzle body 10 and may provide electric power while also being connected to the spray nozzle chip 11 by the medium of the terminal 13b.

Due to the coupling of the spray nozzle chip and the connector, the components exhibits a safer constraining force by the horizontal and vertical fastening structure in addition to the constraint caused by the compulsory press-fitting.

A hole 14 passing through the thickness of the heat emitting element 13a of the heat emitter 13 is formed at a rear end of the heat emitting element 13a, and the washer liquid introduced into the passage 12 of the spray nozzle chip 11 after being raised from the bottom of the nozzle body 10 may be branched while flowing to the upper side, that is, into a passage space on the upper side of the heat emitting element 13a through the hole 14.

The heat emitting element 13a may be basically formed of a material such as plastic, PTC, or ceramic PTC, and also may be formed of a metal which emits heat but may be applied after a surface of the heat emitting element 13a is painted or coated to prevent corrosion.

A connection portion of the heat emitting element 13a and the terminal 13b may be surrounded by a sealing pad 13d, and accordingly the terminal can be protected from the washer liquid.

That is, the sealing pad 13d functions to protect the terminal from the washer liquid and prevent moisture from being introduced into the connection portion of the terminal 13b and the connector 13c, and is press-fitted with a sealing pad mounting recess 16 formed at a rear end of the spray nozzle chip 11, that is, on a rear wall surface of the passage 12.

In particular, the spray nozzle according to the present invention has a dual spray nozzle structure for dually ejecting washer liquid through vertically separated nozzle injection holes, that is, two vertically separated passage outlets 12c.

To this end, the heat emitter 13, that is, the hear emitting element 13a is inserted into and mounted to the passage 12 formed in the spray nozzle chip 11, and the heat emitting element 13a is mounted to a vertically intermediate location of the passage 12 such that the section of the nozzle can be separated vertically.

That is, the passage may be separated into an upper passage and a lower passage with reference to the heat emitting element 13a, and may provide a dual spray nozzle structure in which washer liquid is ejected through the two passages located on the upper and lower sides.

Figure 5:
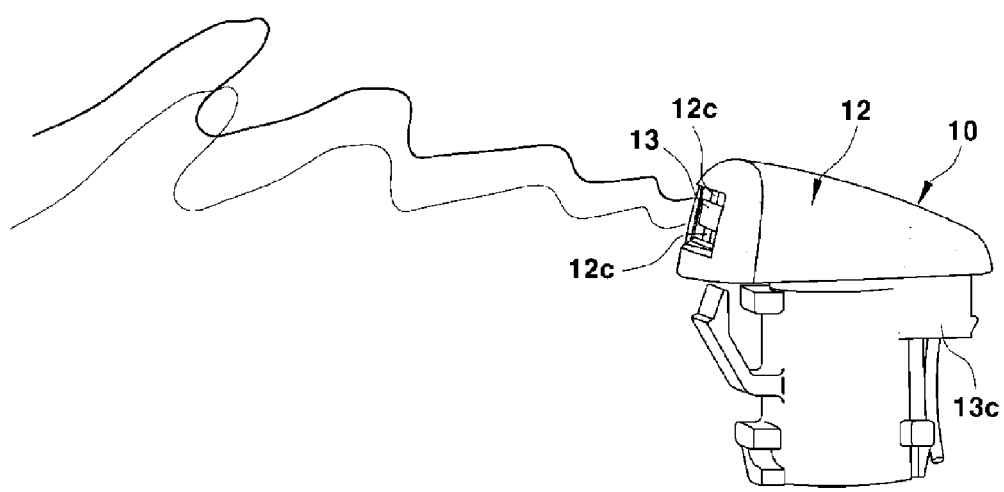
FIG. 5 is a perspective view showing an in-use state heat emitter of the exemplary spray washer nozzle according to the present invention.

For example, as shown in FIG. 5, the spray nozzle chip 11 is inserted into and mounted to the head portion of the nozzle body 10, and the heat emitter 13 is inserted into and mounted to the passage 12 of the spray nozzle chip 11.

The rear end terminal 13b of the heat emitter 13 is electrically connected to the connector 13c mounted to a rear side of the nozzle body 10.

Accordingly, the washer liquid raised from the bottom of the nozzle body 10 is introduced into the passage 12 of the spray nozzle chip 11, and some washer liquid introduced in this way is ejected through a lower outlet 12c at a tip end of the nozzle body 10 via the lower passage 12 with respect to the heat emitter 13 and the remaining washer liquid enters an upside of the nozzle body 10 through the hole 14 of the heat emitting element 13a and is ejected through an upper outlet 12c of the tip end via the upper passage 12, so that the washer liquid can be ejected due to the dual spray nozzle structure.

Then, if electric power is supplied to the heat emitter 13 when the washer function is used in the winter season, the washer liquid flowing through the passage 12 of the nozzle chip 11 heats the heat emitter 13, that is, the heat emitting element 13a while directly contacting the heat emitting element 13a, so that heating may be promptly performed and accordingly defrosting time can be shortened and defrosting performance can be improved.

Figure 6A:
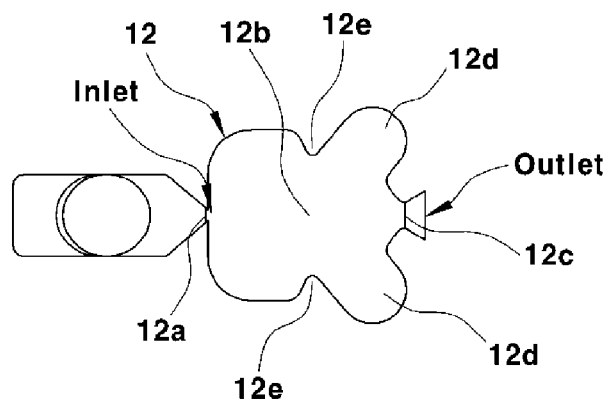
FIG. 6A and FIG. 6B are schematic views showing a passage shape and a flow analysis of an interior of the spray nozzle chip of the exemplary spray washer nozzle according to the present invention.
Figure 6B:
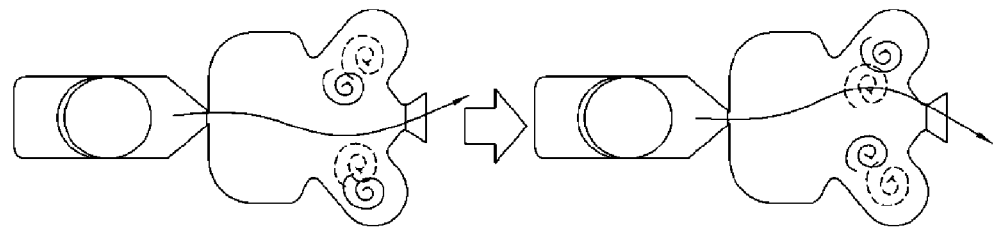

FIG. 6A and FIG. 6B are schematic views showing a passage shape and a flow analysis of an interior of the spray nozzle chip of the spray washer nozzle according to various embodiments of the present invention.

As shown in FIG. 6A and FIG. 6B, the passage 12 formed in the spray nozzle chip 11 includes an inlet 12a at a rear end thereof through which washer liquid is introduced, an intermediate passage space 12b formed in the inlet 12a and the outlet 12c, and an outlet 12c at a tip end thereof through which the washer liquid is finally ejected.

In particular, two stagnant flow forming spaces 12d are formed at opposite sides of an inner peripheral area of the passage space 12b, and the two stagnant flow forming spaces 12d are partitioned by border walls 12e on opposite sides protruding toward the center of the width of the passage.

That is, two border walls 12e protruding toward the center of the width of the passage from a peripheral wall surface of the passage space 12b and facing each other are formed in the interior of the passage 10, and two stagnant flow forming spaces 12d are formed peripheral areas of the opposite sides of a location between the border wall 12e and the outlet 12c.

The above-structured spray washer nozzle causes flows of the washer liquid due to movement of stagnant flows by the stagnant flow forming space in the interior of the nozzle and accordingly may rapidly increase an ejection angle of the washer liquid at the outlet of the nozzle.

That is, if the washer liquid is introduced from the inlet, stagnant flows are formed in the washer liquid due to the stagnant flow forming space, that is, the circular flow space, so that the washer liquid is flowed leftwards and rightwards by the movement of the stagnant flows, whereby the ejection angle of the washer liquid can be expanded and the ejection angle of the washer liquid can be widely secured so that the spray nozzle can be suitable for middle and large-sized vehicles which require a wide cleaning area.

In this way, according to the present invention, as a heat emitting element chip is inserted into the interior space of the spray nozzle chip, a structure for directly heating and defrosting a washer liquid freezing part can be realized, and accordingly defrosting performance can be improved through a direction heating method by improving an existing indirect heating method. Further, because the heat emitting element is configured in a chip type such that the spray nozzle can be separated into upper and lower parts, the dual spray nozzle can be realized and heat emission efficiency can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A spray washer nozzle for a vehicle comprising:
a nozzle body installed in a hood of a vehicle as a unit for ejecting washer liquid to a windshield, and connected to a hose for supplying the washer liquid and fixedly installed in a hood panel at the same time;
a spray nozzle chip having a passage therein and inserted into a head part of the nozzle body; and
a heat emitter that is inserted into and mounted to the passage formed in an interior of the spray nozzle chip such that washer liquid flowing through the passage of the spray nozzle chip is heated while directly contacting the heat emitter,
wherein the heat emitter comprises:
- a plate-shaped heat emitting element
- a terminal mounted to a rear end of the heat emitting element, and
- a connector fixed to the nozzle body while being connected to the terminal.

2. The spray washer nozzle of claim 1, wherein the heat emitter further comprises a sealing pad mounted to a connection portion of the heat emitting element and the terminal, for protecting the terminal from the washer liquid.

3. The spray washer nozzle of claim 1, wherein the heat emitting element has a hole passing through a thickness of the heat emitting element and is mounted to a vertically intermediate location of the passage located in the spray nozzle chip such that a section of the nozzle automatically has a dual spray nozzle structure while being separated into upper and lower parts.

4. The spray washer nozzle of claim 1, wherein the heat emitting element of the heat emitter is formed of plastic PTC or ceramic PTC.

5. The spray washer nozzle of claim 1, wherein the spray nozzle chip comprises an inlet at a rear end thereof through which washer liquid is introduced, an intermediate passage space, and an outlet at a tip end thereof through which the washer liquid is ejected, and two stagnant flow forming spaces are formed at opposite sides of an inner peripheral area of the passage space, and the two stagnant flow forming spaces are partitioned by border walls on opposite sides protruding toward a center of a width of the passage.

* * * * *